United States Patent [19]
Konishi et al.

[11] Patent Number: 5,951,094
[45] Date of Patent: Sep. 14, 1999

[54] ARM REST FOR A VEHICLE

[75] Inventors: Masaaki Konishi, Atsugi; Masaru Onishi, Sagamihara, both of Japan

[73] Assignee: Nissan Motor Co., Ltd., Kanagawa, Japan

[21] Appl. No.: 08/770,579

[22] Filed: Dec. 19, 1996

[30] Foreign Application Priority Data

Dec. 28, 1995 [JP] Japan ................................ 7-342487

[51] Int. Cl.⁶ ........................................ B60J 9/00
[52] U.S. Cl. ...................... 296/153; 296/189; 280/751; 297/411.21
[58] Field of Search .................... 296/153, 189; 280/751; 297/411.21, 411.46, 411.2

[56] References Cited

U.S. PATENT DOCUMENTS

| | | | |
|---|---|---|---|
| 3,400,979 | 9/1968 | James ........................................ | 296/153 |
| 4,077,495 | 3/1978 | Chase . | |
| 4,204,659 | 5/1980 | Phillips et al. . | |
| 4,352,484 | 10/1982 | Gertz et al. ........................... | 256/13.1 |
| 4,456,644 | 6/1984 | Janz et al. ............................ | 296/153 X |
| 4,783,114 | 11/1988 | Welch . | |
| 4,803,108 | 2/1989 | Leuchten et al. . | |
| 5,306,066 | 4/1994 | Saathoff . | |
| 5,527,084 | 6/1996 | Scherf ................................ | 296/189 X |

FOREIGN PATENT DOCUMENTS

| | | | |
|---|---|---|---|
| 509855 | 2/1955 | Canada ................................ | 296/153 |
| 2906288 | 9/1998 | Germany ............................. | 296/153 |
| 1-158329 | 11/1989 | Japan . | |

*Primary Examiner*—D. Glenn Dayoan
*Assistant Examiner*—Chad D. Wells
*Attorney, Agent, or Firm*—McDermott, Will & Emery

[57] ABSTRACT

An arm rest mounted to an arm rest support portion of a trim assembly, includes a substrate and a pad on the substrate. The substrate has an energy absorbing structure adapted to be collapsible in a predetermined direction in response to application of a load to the arm rest in the predetermined direction. The energy absorbing structure of a generally honeycomb shape includes a plurality of ribs interconnected to define a plurality of openings. Resilient pawls and a resilient clip are disposed on the substrate to be engaged with peripheral edges of insertion holes of the arm rest support portion.

15 Claims, 8 Drawing Sheets

ARM REST FOR A VEHICLE

BACKGROUND OF THE INVENTION

1. Field of the Invention

The present invention relates to an arm rest for a vehicle and, more specifically, to an arm rest as a separate part mounted on a trim assembly of the vehicle.

2. Description of the Related Art

It is well known in motor vehicles to provide an arm rest on a support portion projecting inboard from a door trim assembly.

Japanese Patent Application First Publication No. 1-158329 discloses a mounting structure of an arm rest to a door trim panel of a vehicle. The door trim panel partly projects inboard to provide an arm rest support portion to which the arm rest is mounted. The arm rest includes a resin substrate with a plurality of clips engageable with peripheral edges of holes formed on the arm rest support portion. The arm rest is mounted to the arm rest support portion by sliding in one direction relative to the arm rest support portion after inserting the clips into the holes. One of the clips has a leaf spring acting as a lock for preventing a movement of the arm rest in the other direction relative to the arm rest support portion.

There is a demand for providing an arm rest exhibiting a good energy absorption in a case where a load is applied to the arm rest, for instance, a side collision of the vehicle, and having a mounting structure with an enhanced rigidity.

SUMMARY OF THE INVENTION

According to one aspect of the present invention, there is provided an arm rest for a vehicle, comprising:

a substrate;

a pad on the substrate; and the substrate including an energy absorbing structure adapted to be collapsible in a predetermined direction in response to application of a load to the arm rest in the predetermined direction.

According to a further aspect of the present invention, there is provided in a vehicle, a trim assembly providing an arm rest support portion; and an arm rest mounted to the arm rest support portion, the arm rest including a substrate and a pad on the substrate, the substrate having an energy absorbing structure adapted to be collapsible in a predetermined direction in response to application of a load to the arm rest in the predetermined direction.

DESCRIPTION OF THE PREFERRED EMBODIMENT

Referring to FIGS. 1–9, a preferred embodiment of an arm rest 10 for a vehicle, according to the present invention is now explained.

Figure 2:
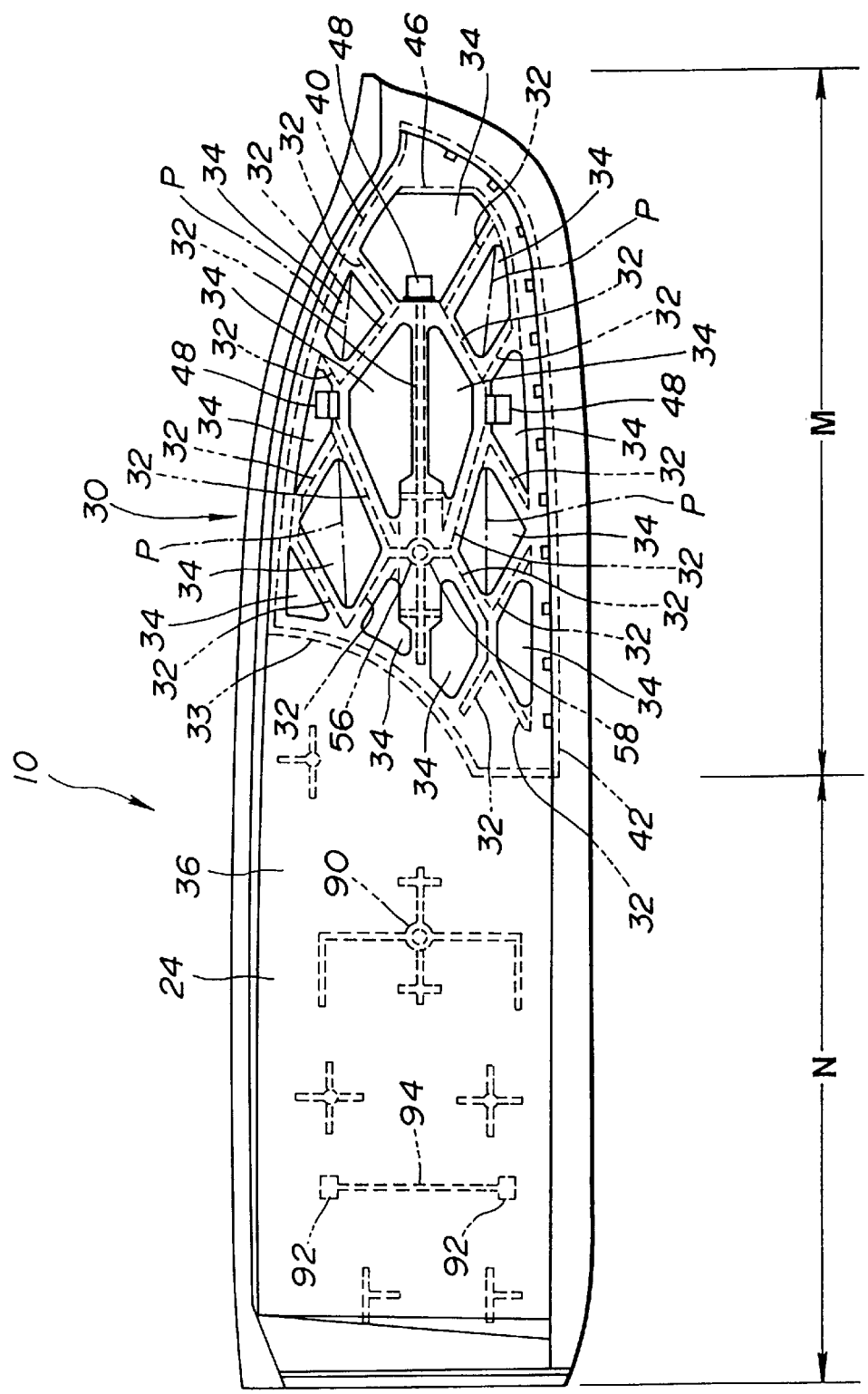
FIG. 2 is a top plan view of a substrate of the arm rest.
Figure 3:
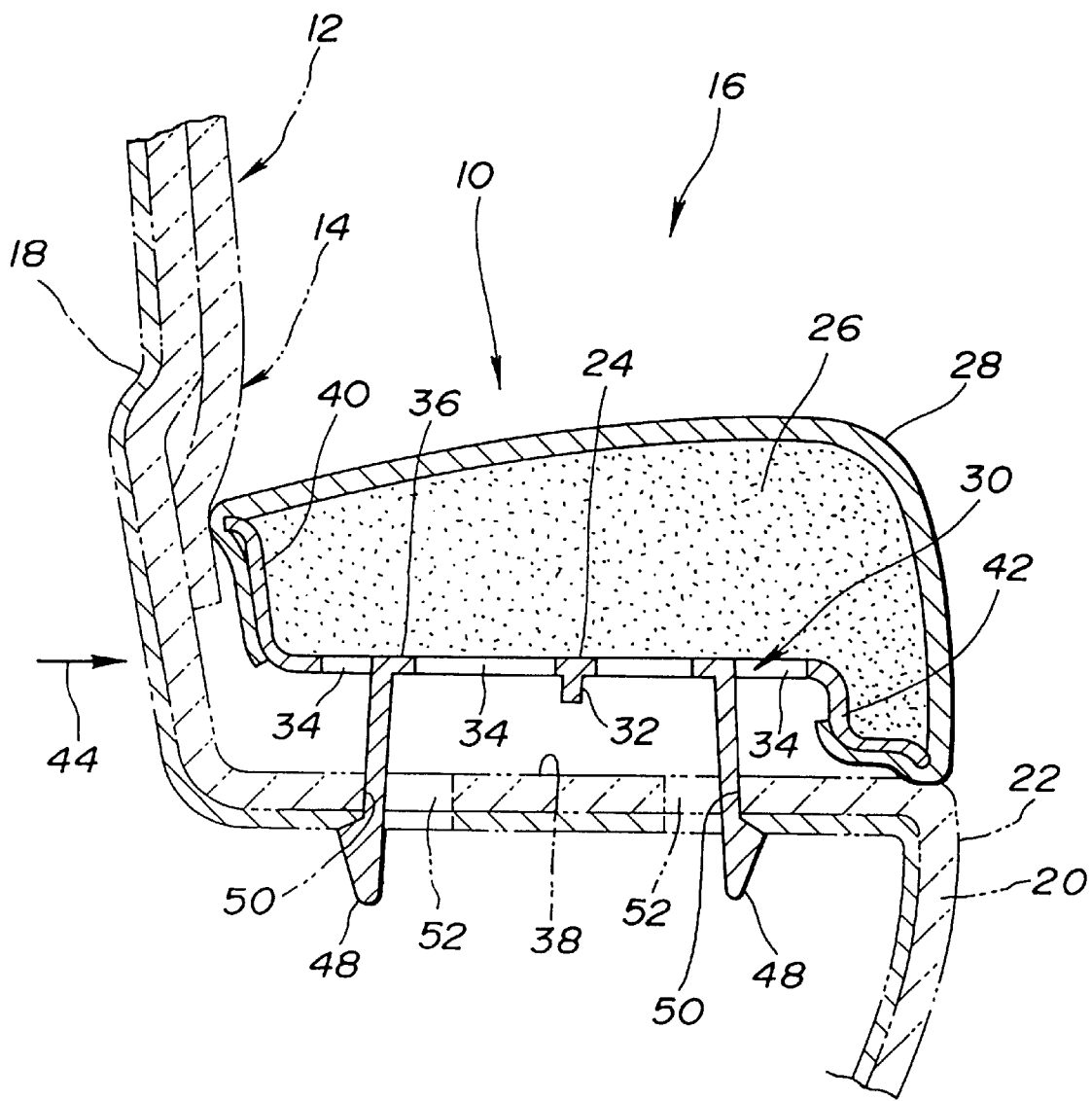
FIG. 3 is a section taken along line 3—3 of FIG. 1, showing the arm rest and an arm rest support portion of a trim assembly.

As illustrated in FIG. 3, the vehicle 12 includes a door trim assembly 14 adjacent a passenger compartment 16. The door trim assembly 14 is disposed inside a door inner panel, not shown, which constitutes of a side wall of the passenger compartment 16. The door trim assembly 14 includes a door trim panel 18 and a decorative layer 20 covering the door trim panel 18. The door trim assembly 14 has an arm rest support portion 22 projecting into the passenger compartment 16. The arm rest support portion 22 is elongated in a longitudinal direction of the vehicle 12. Mounted to the arm rest support portion 22 is the arm rest 10 on which an occupant's arm is placed. The arm rest 10 is elongated in the longitudinal direction of the vehicle 12 and in substantially alignment with the arm rest support portion 22. The arm rest 10 includes a rear portion M and a front portion N as shown in FIGS. 1 and 2.

The arm rest 10 includes a substrate or base plate 24, a pad 26 on the substrate 24, and a skin 28 disposed on the pad 26. The substrate 24 is made of a suitable synthetic resin, for instance, ABS, PP, or the like. The pad 26 is made of a material such as urethane foam and covered with the skin 28. The skin 28 overlaps outer peripheral side portions of the substrate 24.

The substrate 24 includes an energy absorbing structure 30 adapted to be collapsible in a predetermined direction in response to application of a load to the arm rest 10 in the predetermined direction. The energy absorbing structure 30 is so constructed as to withstand the load applied thereto until the load applied thereto reaches a predetermined value. The energy absorbing structure 30 is disposed at the rear portion M to which the load is applied.

Figure 1:
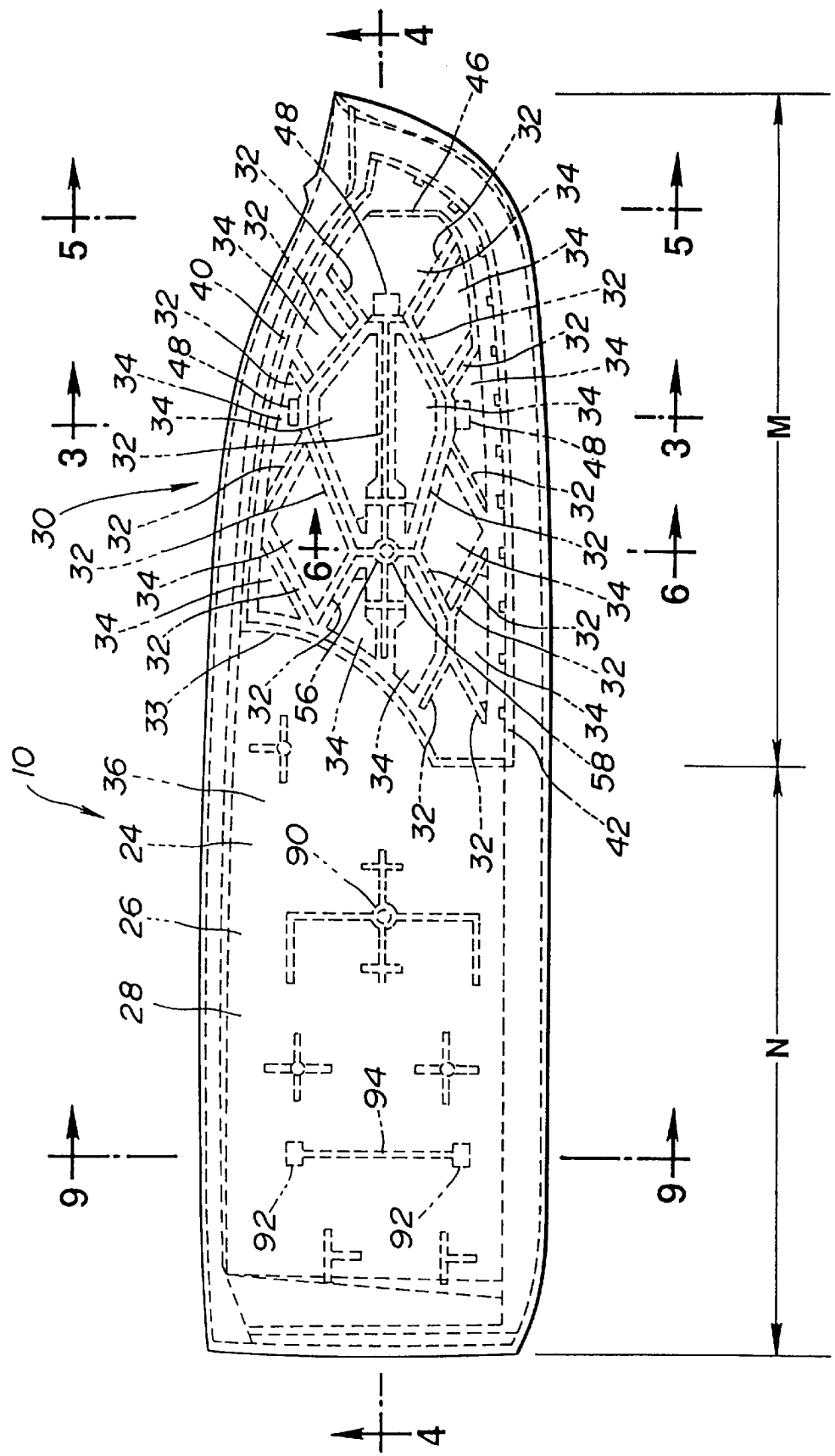
FIG. 1 is a top plan view of an arm rest for a vehicle, according to the present invention.

As illustrated in FIGS. 1–3, the energy absorbing structure 30 includes a plurality of ribs 32 interconnected to define a plurality of openings 34. The energy absorbing structure 30 is of a generally honeycomb shape. The plurality of ribs 32 extend in a direction substantially normal to the predetermined direction in which the load is applied. In FIGS. 1 and 2, reference numeral 33 denotes a groove formed in the substrate 24.

Specifically, the substrate 24 has a generally flat body portion 36 opposed to a mount surface 38 of the arm rest support portion 22 of the door trim assembly 14. The substrate 24 has on its opposite sides an upward flange 40 and a downward and lateral flange 42 which extend from the body portion 36, respectively. The plurality of ribs 32 extend from the body portion 36 downward as viewed in FIGS. 3 and 4, by a length indicated at H in FIG. 4, for instance, a length of approximately 7 mm. Thus, the ribs 32 extend in the direction substantially normal to the predetermined direction, for example, as indicated by arrow 44, in which the load is applied.

Each of the openings 34 of the energy absorbing structure 30 extends in the longitudinal direction of the vehicle further than extends in a lateral direction perpendicular to the longitudinal direction. In this embodiment, as shown in FIGS. 1 and 2, the openings 34 are generally rhombus in shape. The generally rhombus shaped openings 34 have diagonals P of FIG. 2, extending in substantially the longitudinal direction of the vehicle, and the remainder diagonals extending in the lateral direction. The longitudinal diagonals P are greater than the lateral diagonals. The openings 34 are not limited in shape to this embodiment but may be of other shapes including polygons, for example, tetragon, hexagon, and the like, and ellipse.

In a case where a load is applied to the rear portion M of the arm rest 10 in the direction 44 of FIG. 3 upon a side collision of the vehicle 10, the energy absorbing structure 30 provided on the arm rest 10 is subject to the load. When the load applied thereto increases up to a predetermined value, the energy absorbing structure 30 is deformable and collapsible in the direction 44 to thereby absorb energy caused by the load applied thereto. Especially, since the openings 34 of the energy absorbing structure 30 extend in the longitudinal direction further than extend in the lateral direction, the energy absorbing structure 30 is usually certainly crushable in the direction 44 under such condition. Therefore, the energy absorbing structure 30 assures a desirable energy absorption in response to the application of the load to the arm rest 10 as explained.

As illustrated in FIGS. 1, 2, 4, and 5, the substrate 24 has a retaining rib 46 provided for supporting the arm rest 10 on the arm rest support portion 22. The retaining rib 46 is disposed near the rearmost end of the rear portion M. The retaining rib 46 extends in the lateral direction of the arm rest 10 and from the body portion 36 of the substrate 24 downward as viewed in FIGS. 4 and 5. The retaining rib 46 has a greater length than the length H of the ribs 32 of the energy absorbing structure 30. The retaining rib 46 contacts the mount surface 38 of the arm rest support portion 22.

The substrate 24 has a plurality of engaging portions provided for securing the arm rest 10 to the arm rest support portion 22 of the door trim assembly 14. The plurality of engaging portions are disposed at the rear portion M and the front portion N of the substrate 24.

Specifically, as shown in FIGS. 1 and 2, the plurality of engaging portions at the rear portion M include resilient pawls 48 disposed on connecting portions of the ribs 32 of the energy absorbing structure 30 at which the ribs 32 are interconnected. The resilient pawls 48 are formed integrally with the ribs 32. In this embodiment, the resilient pawls 48 are arranged on three connecting portions of the ribs 32. The resilient pawls 48 are disposed adjacent to three corners of the generally rhombus shaped openings 34. The resilient pawls 48 extend downward as viewed in FIGS. 3 and 4, from the connecting portions of the ribs 32 and are engaged with peripheral edges 50 of pawl insertion holes 52 formed in the arm rest support portion 22.

Figure 4:
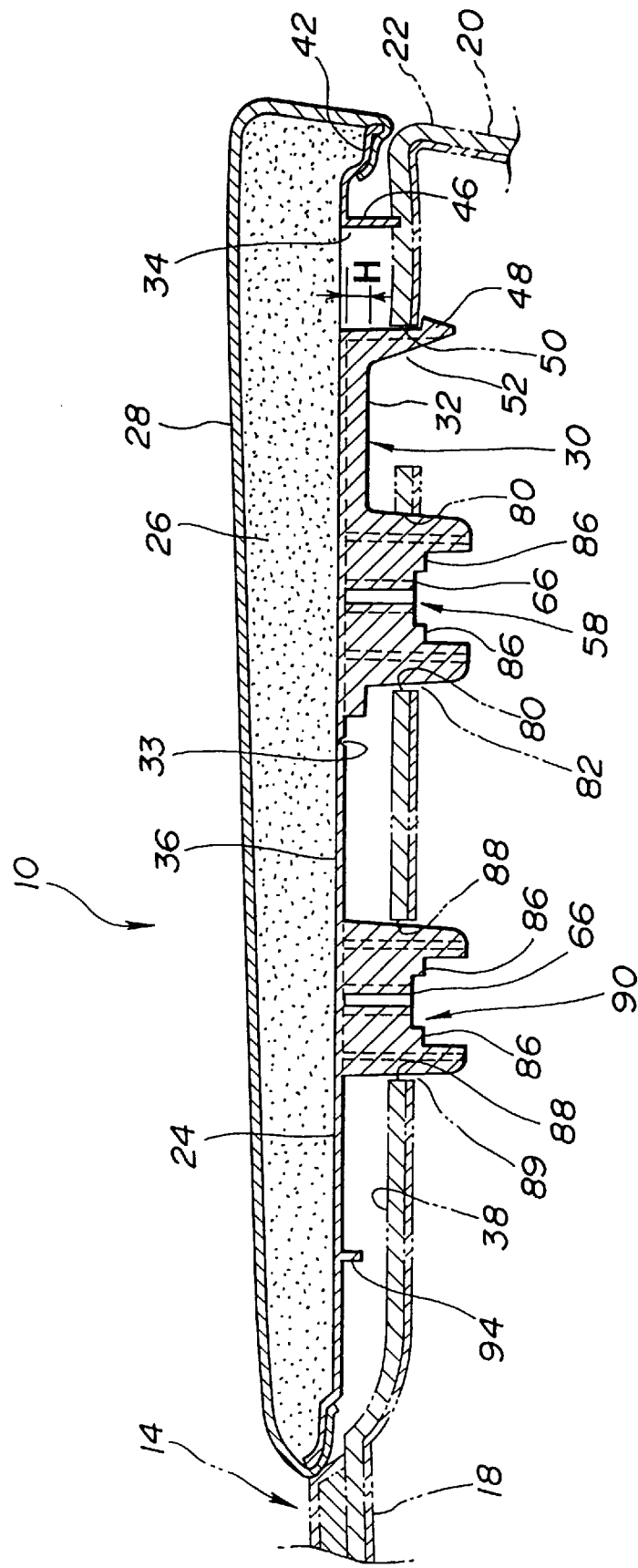
FIG. 4 is a section taken along line 4—4 of FIG.
Figure 5:
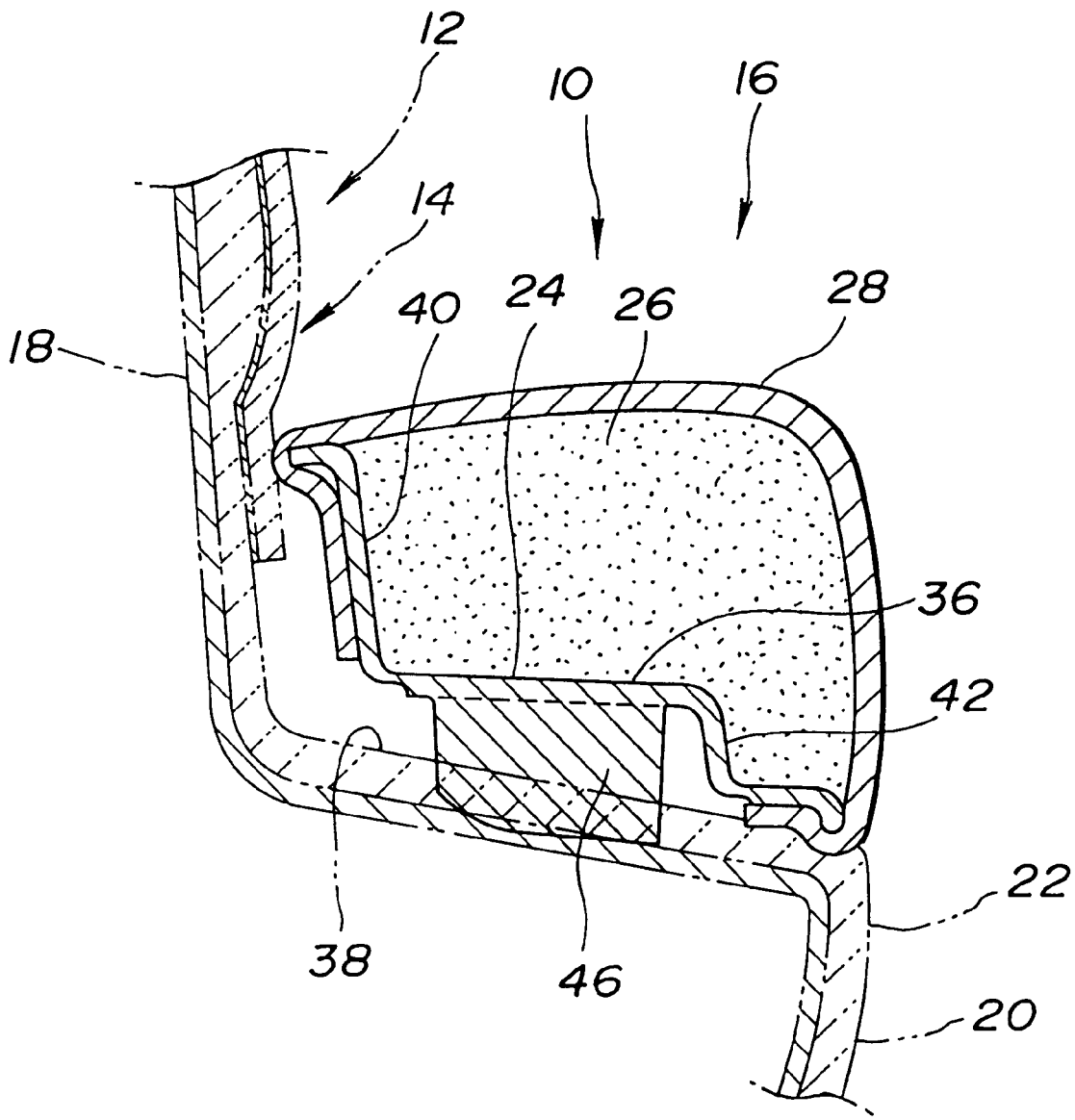
FIG. 5 is a section taken along line 5—5 of FIG. 1, showing a retaining rib of the substrate.
Figure 6:
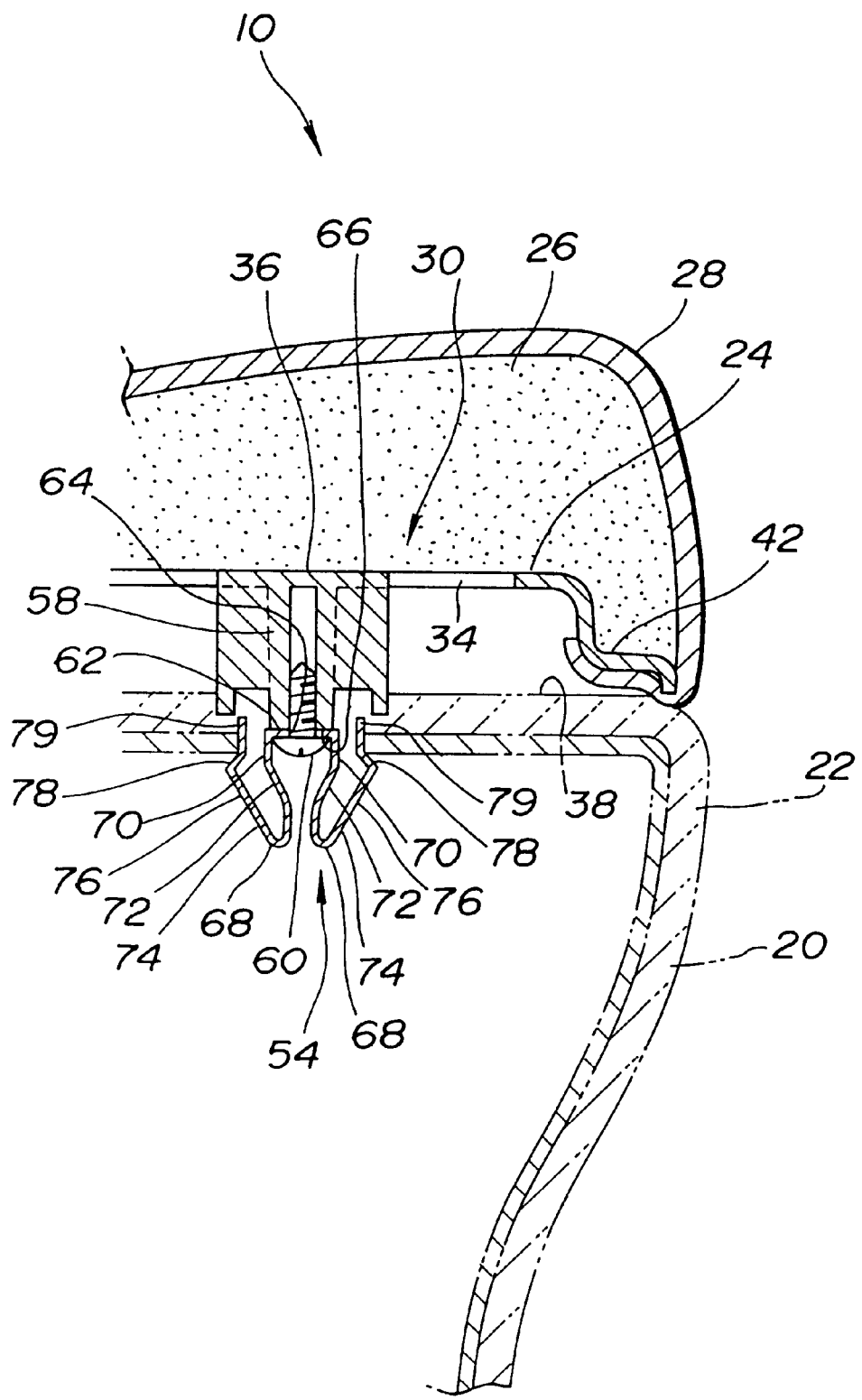
FIG. 6 is a fragmentary section taken along line 6—6 of FIG. 1, showing a clip connected with the substrate.
Figure 7:
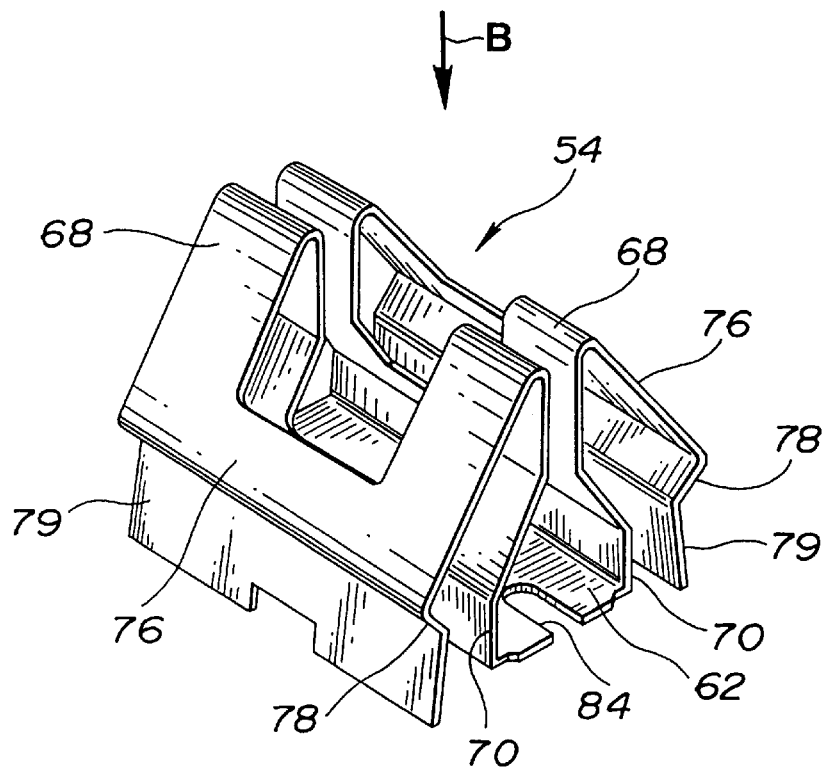
FIG. 7 is a perspective view of the clip.
Figure 8:
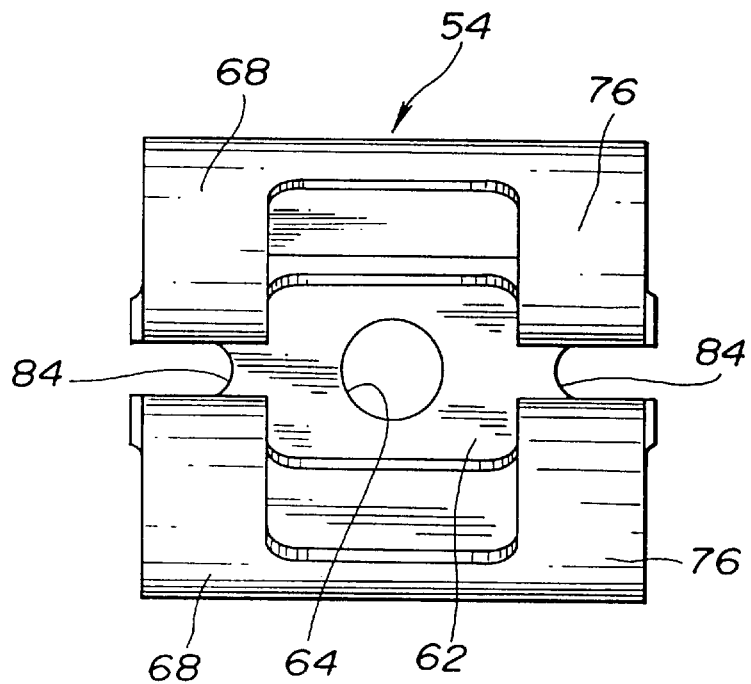
FIG. 8 is a plan view of the clip as viewed from a direction indicated by arrow B of FIG. 7.

The plurality of engaging portions at the rear portion M also include a resilient clip 54 shown in FIGS. 6–8. The resilient clip 54 is made of a steel plate and arranged at a connecting portion indicated at 56 in FIGS. 1 and 2, of the ribs 32 of the energy absorbing structure 30. A boss portion 58 is formed on the connecting portion 56 and integrally with the substrate 24, as shown in FIGS. 4 and 6. The resilient clip 54 is fixed to the boss portion 58 by means of a screw 60. As illustrated in FIG. 6, the resilient clip 54 has a mount portion 62 with a screw insertion hole 64 which is engaged with a bottom surface 66 of the boss portion 58. The mount portion 62 is interposed between the bottom surface 66 and a head of the screw 60. As shown in FIGS. 6 and 7, the resilient clip 54 has a pair of spaced biasing portions 68 extending from opposite sides of the rectangular mount portion 62. The biasing portions 68 include inner upright portions 70 extending substantially upright from the mount portion 62. The biasing portions 68 include inward bends 72 bending in such a direction as to reduce a distance between the biasing portions 68, defining a shorter distance therebetween. The inward bends 72 have straight portions extending upward as viewed in FIG. 7, parallel with each other while keeping the shorter distance. Outward bends 74 are connected to the straight portions of the inward bends 72. The outward bends 74 extend outward at an angle from the straight portions to form a generally V-shaped section. Thus, the resilient clip 54 has sloped surfaces 76 on the outward bends 74 of the biasing portions 68. The outward bends 74 have terminal portions bending toward the inner upright portions 70 to form shoulders 78. Outer straight portions 79 are connected with the terminal portions of the outward bends 74 and extend slightly outward in a spaced relation to the inner upright portions 70. As shown in FIG. 6, the shoulders 78 are engaged with a peripheral edge 80 of a clip insertion hole 82 formed in the arm rest support portion 22 of the trim assembly 14. Reference numerals 84 of FIGS. 7 and 8 denote cutouts formed in the mount portion 62. The cutouts 84 are disposed in opposed relation with respect to the screw insertion hole 64 and extend from opposite longitudinal end edges of the mount portion 62 toward the screw insertion hole 64. The cutouts 84 are engageable with projections 86 shown in FIG. 4, of the boss portion 58 of the substrate 24. The projections 86 extend downward as viewed in FIG. 4, from the bottom surface 66 of the boss portion 58 and are spaced from each other in the longitudinal direction of the arm rest 10. The resilient clip 54 is prevented from its rotating movement on the boss portion 58 by engagement of the cutouts 84 with the projections 86.

Figure 9:
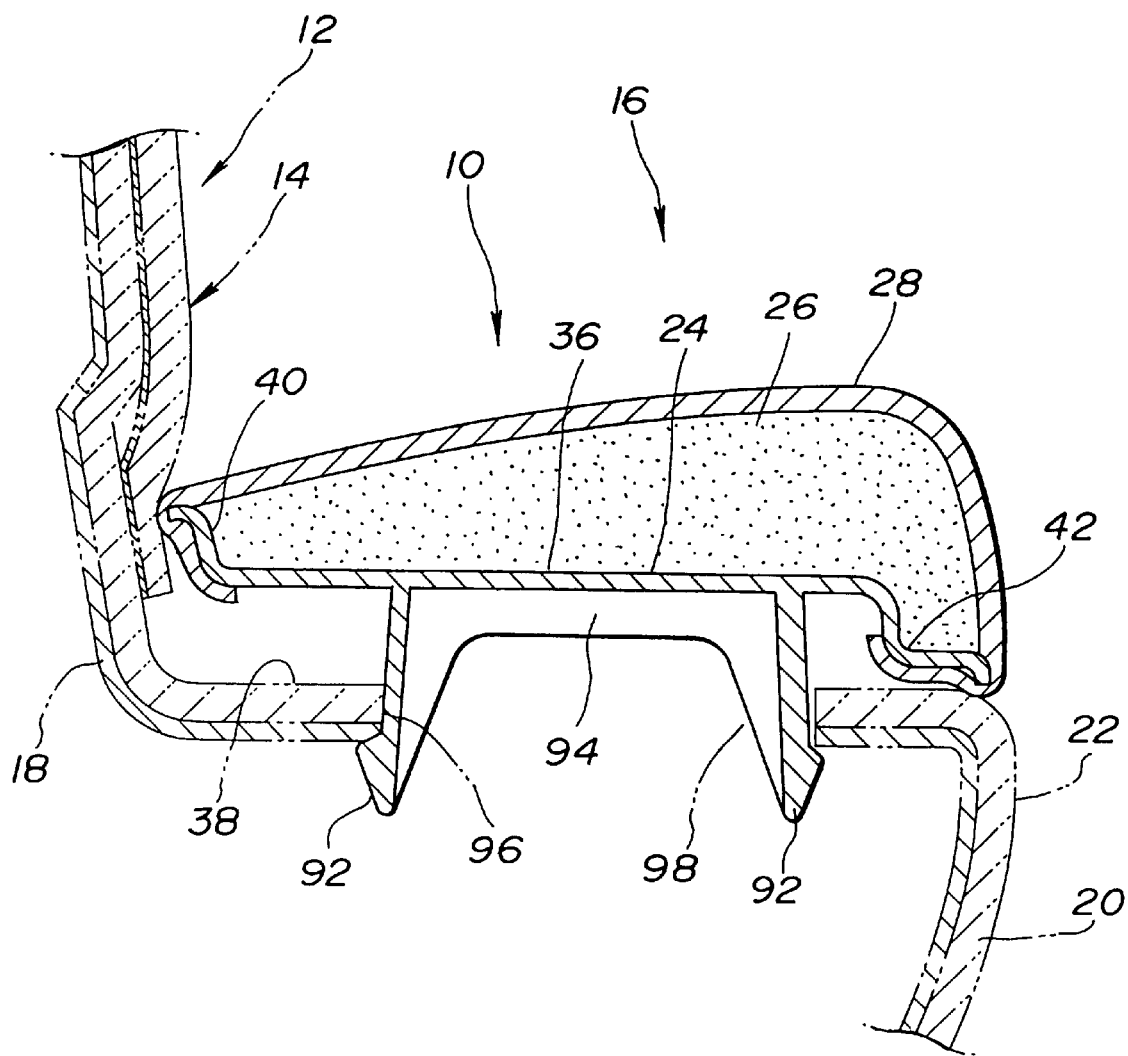
FIG. 9 is a section taken along line 9—9 of FIG. 1, showing pawls bridged by a connecting rib.

As illustrated in FIGS. 1, 2 and 4, the plurality of engaging portions at the front portion N of the substrate 24 includes a boss portion 90. The boss portion 90 is substantially same as the boss portion 58 and therefore detailed explanations therefor are omitted. As shown in FIG. 4, the boss portion 90 is engaged with a peripheral edge 88 of an insertion hole 89. A pair of resilient pawls 92 substantially identical with the resilient pawls 48 are arranged spaced in the lateral direction of the arm rest 10. The resilient pawls 92 are bridged by a connecting rib 94 as best shown in FIG. 9. The resilient pawls 92 are engaged with a peripheral edge 96 of a pawl insertion hole 98 provided in the arm rest support portion 22 of the trim assembly 14.

Upon mounting of the arm rest 10 to the arm rest support portion 22, the resilient pawls 48 and 92 of the substrate 24 are inserted into the corresponding pawl insertion holes 52 and 98. The resilient pawls 48 and 92 are elastically deformed and then engaged with the corresponding peripheral edges 50 and 96 of the pawl insertion holes 52 and 98. At the same time, the resilient clip 54 fixed to the boss portion 58 is inserted into the clip insertion hole 82 of the arm rest support portion 22 and elastically deformed to be engaged with the peripheral edge 80 of the clip insertion hole 82. In this condition, the retaining rib 46 is contacted with the mount surface 38 of the arm rest support portion 22. Thus, the arm rest 10 is mounted to the arm rest support portion 22.

It will be appreciated that since the energy absorbing structure 30 is greater in strength at the connecting portions of the ribs 32, the resilient pawls 48 formed on the connecting portions have an increased rigidity. Accordingly, this arrangement of the resilient pawls 48 provides firm mounting of the arm rest 10 to the arm rest support portion 22. Further, the provision of the resilient clip 54 made of steel plate serves for enhancing firmness of the mounting of the arm rest 10 to the arm rest support portion 22.

The arm rest of the present invention is not limited to the door trim assembly of the above-described embodiment but may be mounted to other trim assemblies of the passenger compartment of the vehicle.

What is claimed is:

1. An arm rest for a vehicle, comprising:

a base plate extending in a predetermined direction with respect to said vehicle;

a pad on said base plate;

said base plate including an energy absorbing structure collapsible in said predetermined direction in response to a load being applied to said base plate in said predetermined direction, said energy absorbing structure including a plurality of ribs extending substantially normally to said base plate and a plurality of openings defined by said ribs, and ribs and said openings cooperating to enable said energy absorbing structure to collapse controllably; and a fastener attached to connecting portions at which said ribs are connected with one another, wherein said predetermined direction is a lateral direction of the vehicle, wherein each of said plurality of ribs extends at a slant to the lateral direction of the vehicle at least at the connecting portions and each of said plurality of openings extends in a longitudinal direction of the vehicle further than extends in the lateral direction.

2. An arm rest as claimed in claim 1, wherein said energy absorbing structure is disposed at a portion of said base plate to which the load is applied.

3. An arm rest as claimed in claim 1, wherein said energy absorbing structure is formed integrally with said base plate.

4. An arm rest as claimed in claim 1, wherein each of said plurality of openings is polygonal in shape and has a greatest diagonal extending in substantially the longitudinal direction of the vehicle.

5. An arm rest as claimed in claim 1, wherein said fastener includes resilient pawls formed integrally with said plurality of ribs.

6. An arm rest as claimed in claim 1, wherein said fastener includes a resilient clip fixed to a boss portion formed on the connecting portions of said ribs.

7. An arm rest as claimed in claim 6, wherein said resilient clip is made of a steel plate.

8. In a vehicle having a passenger compartment, a trim assembly including an arm rest support portion projecting into the passenger compartment; and an arm rest mounted to said arm rest support portion, said arm rest comprising:

a) a base plate opposed to said arm rest support portion, said base plate extending in a lateral direction of the vehicle and including an energy absorbing structure collapsible in the lateral direction of the vehicle in response to a load being applied to said base plate in the lateral direction of the vehicle, said energy absorbing structure including a plurality of ribs extending substantially normally to said base plate and a plurality of openings defined by said ribs, said ribs and said openings cooperating to enable said energy absorbing structure to collapse controllably;

b) a pad on said base plate; and c) a fastener for fixing said base plate to said arm rest support portion, said fastener being attached to connecting portions at which said ribs are connected with one another.

9. A vehicle as claimed in claim 8, wherein each of said plurality of ribs extends at a slant to the lateral direction of the vehicle at least at the connecting portions and each of said plurality of openings extends in a longitudinal direction of the vehicle further than extends in the lateral direction of the vehicle.

10. A vehicle as claimed in claim 9, wherein said energy absorbing structure is disposed at a portion of said base plate to which the load is applied.

11. A vehicle rest as claimed in claim 9, wherein said energy absorbing structure is formed integrally with said base plate.

12. A vehicle as claimed in claim 9, wherein each of said plurality of openings is polygonal in shape and has a greatest diagonal extending in substantially the longitudinal direction of the vehicle.

13. A vehicle as claimed in claim 9, wherein said fastener includes resilient pawls formed integrally with said plurality of ribs and pawl insertion holes formed in said arm rest support portion and engaged with the resilient pawls.

14. A vehicle as claimed in claim 9, wherein said fastener includes a resilient clip fixed to a boss portion formed on the connecting portions of said ribs, and a clip insertion hold formed in said arm rest support portion and engaged with the resilient clip.

15. A vehicle as claimed in claim 14, wherein said resilient clip is made of a steel plate.

* * * * *